(No Model.)

A. WITTAMER.
APPARATUS FOR THE MANUFACTURE OF ILLUMINATING GAS.

No. 261,507. Patented July 18, 1882.

Witnesses
J. A. Rutherford
Robert Ewell

Inventor
Arthur Wittamer
By James L. Norris
Atty

UNITED STATES PATENT OFFICE.

ARTHUR WITTAMER, OF ANTWERP, BELGIUM.

APPARATUS FOR THE MANUFACTURE OF ILLUMINATING-GAS.

SPECIFICATION forming part of Letters Patent No. 261,507, dated July 18, 1882.

Application filed October 5, 1881. (No model.) Patented in Belgium January 24, 1881, No. 53,670; in France April 15, 1881, No. 142,340, and in England July 13, 1881, No. 3,069.

*To all whom it may concern:*

Be it known that I, ARTHUR WITTAMER, of Antwerp, Belgium, have invented a new and useful Improved Apparatus for the Manufacture of Illuminating-Gas, (for which I have obtained provisional protection in Great Britain, dated 13th July, 1881, No. 3,069, a patent in Belgium, dated 24th January, 1881, No. 53,670, and a patent in France, dated 15th April, 1881, No. 142,340,) of which the following is a specication.

This invention relates to improved apparatus for transforming suitably-prepared atmospheric air into illuminating-gas by means of liquid and volatile hydrocarburets or hydrocarbons, such as petroleum, ether, benzine, and the like. The several parts of the said apparatus are so combined as to produce air-gas under conditions which render the same suitable for illuminating public and private places and localities.

Numerous experiments made for the purpose of ascertaining the true nature of air-gas have demonstrated that this gas is not a simple vapor, but a mixture of hydrocarbon vapors with atmospheric air. This opinion is also held by several eminent English and German professors. To produce from volatile hydrocarburets or hydrocarbons and air a good illuminating-gas it is therefore necessary, first, to properly purify the air prior to its entrance into the carburetor; second, to impart to the air the temperature which renders it most appropriate for carburization; third, to compensate for the cold produced by evaporation; fourth, to introduce the air in the form of very thin jets, and to continually stir the carbureting-liquid, so as to promote the dissolution and prevent the formation of residues; fifth, to allow the air to be in contact with the carbureting-liquid for a sufficiently long time to permit the proper carburization to take place; sixth, to compel the air to deposit before entering the distributing devices the condensible vapors and particles of liquid it may have carried away. These conditions are realized by the employment of the apparatus constructed according to this invention and shown in the accompanying drawings, in which—

Figure 1:
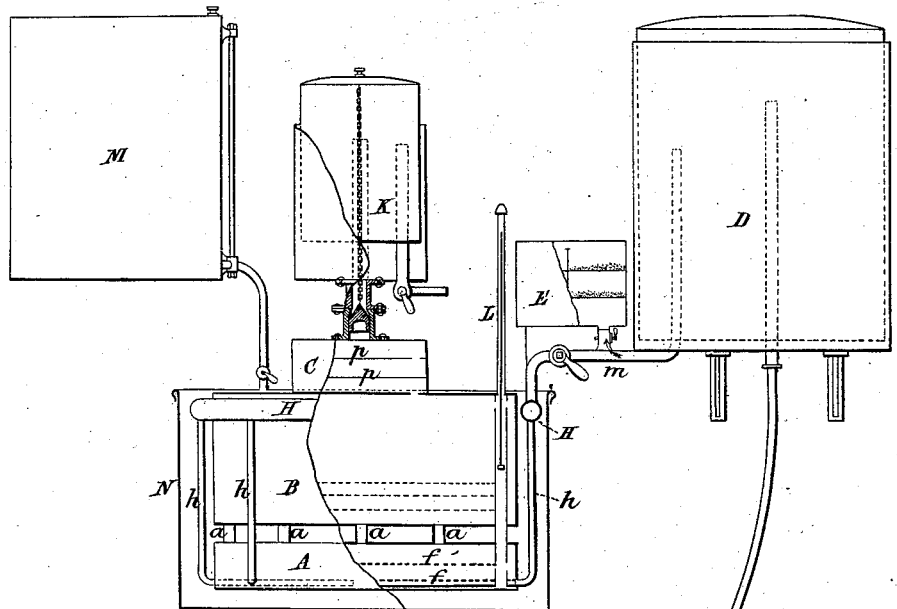
Figure 2:
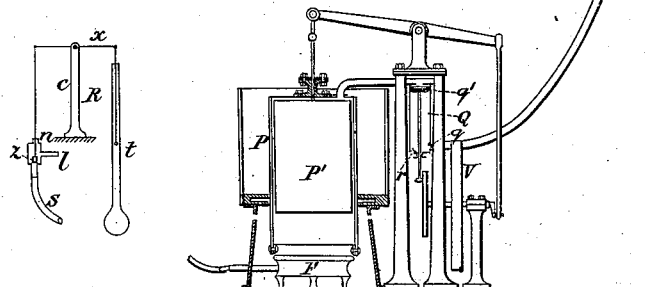

Figure 1 is an elevation, partly in section, of my improved apparatus, and Fig. 2 a detached view of the regulator for regulating the temperature of the water surrounding the carburetor.

In connection with my improved carburetor I propose employing an air-pump constructed as follows:

P is a pot or receptacle the lower part of which is heated by means of a gas-stove, F. This gas-stove is supplied with gas by the apparatus itself.

P' is a cylinder free to move in the receptacle P.

Q is the cylinder or body of the caloric pump. It is provided at its lower end with two valves, $q$ and $r$.

$q'$ is a piston which moves in the said cylinder Q.

V is the fly-wheel of the pump.

The air which is in contact with the bottom of the receptacle P becomes heated by the flame from the gas-stove F, and passes between the walls or sides of this receptacle and the cylinder P', and then acts on the piston $q'$. This piston descends and compresses the air contained in the pump-body, the valve $r$ closes, the valve $q$ opens, and the expelled air passes into an air vessel or bell, D. When the piston $q'$ is at the lower end of its stroke the cylinder P' is at the bottom of the receptacle P, and the air contained in the latter occupies the upper part of the same and is cooled by contact with the sides surrounded by cold water. A partial vacuum is thus produced on the upper face of the piston $q'$, and atmospheric pressure acting on its lower face tends to raise the said piston. The valve $r$ then opens and the valve $q$ closes, and the pump-body becomes filled with air. To start this machine it will suffice to properly heat the bottom of the receptacle P, and then by hand to give a turn to the fly-wheel V. For stopping the machine it is only necessary to open a cock placed at the upper part of the pump-body Q. By opening this cock the pump-body is caused to communicate with the atmospheric air, and the pump is immediately stopped.

By the employment of this pump and the arrangement of the accessory parts of the carburetor hereinafter described my improved apparatus is rendered automatic.

I also propose employing a purifier, which, however, will be only required in winter and when the apparatus is erected in a damp place. It consists of a simple cylindrical case, E, which can be hermetically closed. This case has two orifices or openings, one for the admission of air, and the other for the exit thereof. It incloses two horizontal sheets of wire-gauze, which are placed one above the other and support two layers of purifying material. The upper layer consists of hydrate and oxide of lime mixed with chaff and sawdust for facilitating the passage of the air. The second layer consists of oxide of lime, chaff, and sawdust impregnated with dilute sulphuric acid.

My improved carburetor consists of three superimposed cylinders, A B C, surrounded by a single casing or jacket, N, containing water. The cylinder B is connected with the cylinder A by means of a series of tubes or pipes, $a\ a$, open at both ends. The cylinder A and part of the cylinder B are filled with a suitable carbureting-liquid. A quantity of such liquid is stored in the reservoir M, from which the apparatus can be charged without any danger by means of a tube and a cock. The level of the carbureting-liquid is denoted by an indicator or gage, L. In practice atmospheric air is forced into the reservoir or bell D by the above-described caloric-pump and passes thence through the tube $m$ into the large copper tube H surrounding the cylinder B, then into the copper tubes $h\ h$, from which it escapes, in the form of exceedingly small or fine jets, at the bottom of the cylinder A. For this purpose the tubes $h\ h$ have on that part of them which extends within the carburetor a series of holes of less than a millimeter in diameter. The air has a tendency to rise, but is arrested or hindered in its course or progress by a series of superimposed perforated plates, $f\ f$, of sheet-iron, through the holes of which it has to find a passage. It arrives, transformed into illuminating-gas, in the upper part of the cylinder B. The gas, after having, by impinging against plates $p\ p$ in the cylinder C, freed itself from the drops or particles of liquid it may have carried away or contained, enters the regulator K and passes thence into the service-pipes, which it reaches perfectly dry and deprived of condensible vapors. To more perfectly attain this removal of the drops or particles of liquid from the gas, the latter can be caused to traverse the longest possible path or distance between the plates $p\ p$ by interposing between the said plates metal bands or strips rolled up into spiral form, said strips, however, not being herein shown.

For use during cold weather, I use a regulating apparatus or thermometer, R, which can be advantageously applied to a gas-burner placed below the casing or jacket N, and which serves for regulating the heat or temperature of the water in which the carburetor is immersed. This regulating apparatus, which is shown detached from the carburetor, consists of an ordinary thermometer, $t$, on the mercury column of which floats a light body connected with a small cylindrical valve, $z$, by means of the swinging beam $x$, supported by the pillar or upright $c$. This cylinder $z$ is inclosed within a box, $n$, provided with a tubular part, $l$, connected by an india-rubber tube to a pipe supplying some of the gas produced by the apparatus. Another india-rubber tube connects the tube S with the gas-burner placed beneath the casing N. The quantity of mercury in the thermometer can be so adjusted that the cylinder $z$ will be just above the tube S when the temperature of the water in the casing N is becoming too elevated for the proper manufacture of the gas. To cause the regulator to operate the gas at the burner is lighted and hot water commences to circulate, thereby causing the thermometer to rise, and consequently the cylinder $z$ to descend into the tube S. As soon as this movement takes place the quantity of gas supplied to the burner decreases, the temperature of the water bath then lowers, and the cylinder $z$ rises out of the tube S. The flame at the burner then resumes its original intensity.

Having thus described my improved apparatus I will now proceed to set forth its operation.

For manufacturing gas, the fly-wheel V of the caloric pump is turned by hand until the bell of the reservoir D is raised to its highest point—that is to say, until the exhaust-valve acts. A suitable quantity of atmospheric air is thus stored in the said reservoir. This air is then allowed to pass into the carburetor, so that gas is produced which will serve to supply the burner of the pump and, if required, that of the casing N. After two or three minutes it will suffice to turn the fly-wheel by hand and the motor will start. It will be understood that all the air in the reservoir D is not exhausted by heating the receptacle P sufficiently to start the pump, the power of the pump being in all cases so calculated as to be able to supply a more powerful carburetor than that to which the pump is coupled. Thus the bell of the reservoir D will always be raised to its highest point. When in the evening all the lights are extinguished and the machine is arrested without emptying the reservoir D, a sufficient air-reserve will be kept for feeding the burner of the motor until the latter has become sufficiently hot to work automatically. When the apparatus has been at work once, it will be readily understood, the starting is much simplified, as it is only requisite to put the reservoir D in communication with the carburetor to light up the burner of the motor, and after waiting one or two minutes to give the fly-wheel a turn by hand to start the apparatus.

The purification of the air is effected as follows, viz: If the atmospheric air of the locality where the gas is to be manufactured were simply introduced into the carburetor, the gas would be subjected to all the variations of temperature, and its illuminating power would vary, which would be very disadvantageous. For this reason I purify the air by depriving it of its aqueous vapor, its carbonic acid, and its ammonia, and, in fact, of all the substances which are injurious to the illuminating power of gas. The presence of aqueous vapor in the gas in winter causes the condensation of the gas in the pipes and the obstruction of the supply. If the air from which the gas is made contains aqueous vapor, the gas will also contain some. This water condenses in the service-pipes and carries away in its condensation (by chemical affinity) the gas itself, though the latter is much less condensible. The obstruction of the service-pipes is a consequence of the condensation, as the water becomes frozen. It is therefore very advantageous to introduce pure air into the carburetor.

I provide for the introduction of the air into the carburetor at the most suitable temperature, as follows: At first sight it would appear that it is perfectly indifferent at what temperature the air is introduced, provided the temperature of the carbureting-liquid is suitable and constant. No doubt the air on coming in contact with the liquid takes the temperature of the latter, but it would do so only after a certain time, and the carbureting would not be equally effected during the passage of the air through the gasoline or other carbureting-liquid. The air acquires a suitable temperature (12° to 17°,) first, by passing through the body of the pump Q; secondly, by the compression to which it is subjected in the reservoir; and, thirdly, by its passage through the purifying-layers. The water in the jacket or casing N serves to regulate the temperature, and for this purpose the tubes H $h$ are formed of copper and of as great a length as practicable without rendering the apparatus too expensive or too cumbersome.

The cooling produced by evaporation is compensated for as follows—that is to say, the air-gas is the result of an evaporation. Every evaporation has for its consequence a proportionate cooling. Volatile hydrocarbon vapor does not dissolve, or dissolves with difficulty, in air of low temperature. It is therefore very necessary, to insure a constant light, to give a suitable temperature to the carbureting-liquid and to maintain the same by compensating for the cooling consequent upon evaporation.

In the above-described apparatus the cold is compensated for by the following means—that is to say, first, by the slight heating of the air before it enters the carburetor, as above explained; secondly, by the interior working which the carbureting-liquid is caused to undergo by reason of the pressure imparted to the air by the caloric pump. This working increases as the quantity of air injected into the carburetor is increased—that is to say, when a greater quantity of gas is being made. Now, the heat is proportionate to the working, and consequently it is proportionate to the evaporation—that is to say, to the source of cold. In an apparatus for one hundred burners the power expended upon the interior working amounts to six kilograms per second. The air is introduced in very thin jets, and the carbureting-liquid is constantly stirred, as follows—that is to say, the liquid receives motion from the mechanical working to which it is subjected by the injected air. By continually stirring the liquid I promote the carbureting effect by continually presenting new molecules of liquid to the action of the air.

For allowing the air to be in contact with the naphtha for a long time, provision is also made, as follows: To form an idea of the path a molecule of air has to traverse in the carbureting-liquid it will only be necessary to follow a grain of corn which has to pass through several sieves placed one above the other. In winter, when the carbureting takes place with more difficulty than in summer, the path to be passed by the air will be increased by filling the carburetor with a greater quantity of gasoline than is the case in warm weather.

It will be obvious from the description of the carburetor how the carbureted gas before entering the gasometer is freed from all liquid particles it may have carried away.

Prior to my invention air-pumps and purifiers have been employed in connection with a carburetor, and hence are not claimed by me. A hydro-thermostat comprising a mercury-valve has also been used with a carburetor in which the carbureting-vessel is arranged in water, the valve being heated by gas from the carburetor, and the supply of gas for such purpose controlled by the expansion or contraction of the mercury, so as to open or close the passage through the gas-pipe. The thermostat which I employ, however, is differently constructed from those heretofore used in connection with carburetors, and admits of the adjustment of the valve so as to cause it to open or close at a certain point more accurately.

I am aware that it is old to combine with a carburetor having its carbureting-chambers arranged within a water-tank, with a water-space around said carbureting-chambers, a regulator or thermostat adapted to automatically regulate the flow of gas from the carburetor to a burner below said water-tank to maintain the water in the tank at even temperature.

What I claim is—

The combination of the three communicating chambers A B C with the water-tank N, the air-pipe H, surrounding the carburetor-chamber B, the pipes $h$, descending from the air-pipe H to the lower oil-chamber, A, the perforated partitions within said oil-chamber, and means for forcing the air through said air-pipes, substantially as described.

A. WITTAMER.

Witnesses:
  GOVEXERT,
  FR. LERVULLALL.